United States Patent Office 3,419,617
Patented Dec. 31, 1968

3,419,617
ORGANIC CHEMISTRY
Richard C. Doss, Bartlesville, Okla., assignor to Phillips Petroleum Company, a corporation of Delaware
No Drawing. Continuation-in-part of abandoned application Ser. No. 399,862, Sept. 28, 1964. This application June 7, 1965, Ser. No. 462,136
9 Claims. (Cl. 260—601)

ABSTRACT OF THE DISCLOSURE

Alpha - formyl sulfide or alpha,alpha - bis(hydrocarbylthio) aldehyde is formed by reacting alpha-halo aldehyde or alpha,alpha-dihalo aldehyde, respectively, with a thiol in the presence of pyridine and derivatives thereof.

---

This is a continuation-in-part of copending U.S. application Ser. No. 399,862 filed Sept. 28, 1964 and now abandoned.

This invention relates to a method of preparing an α-formyl sulfide. This invention also relates to a method of preparing an α,α-bis-(hydrocarbylthio) aldehyde. This invention also relates to (n-butylthio)acetaldehyde and bis (n-butylthio)acetaldehyde and the methods of making these compounds.

It has been reported that chloroacetaldehyde, in pure form or as an aqueous solution, reacts with alkanethiols in the presence of a minor amount of acid to give 1,1,2-tris(alkylthio)ethanes which, upon heating with a nonvolatile acid, are converted to 1,2-bis(alkylthio)ethylenes.

However, it has been found that the direct replacement of halogen in an α-halo aldehyde or α,α-dihalo aldehyde can be made in a manner such that the aldehyde group or groups are left intact, thereby directly yielding, respectively, an α-formyl sulfide or an α,α-bis(hydrocarbylthio) aldehyde. Surprisingly, the reaction can be effected only in the presence of pyridine and certain derivatives thereof as the solvent. The desired reaction does not occur in the presence of solvents such as water, ether and the like.

Also surprisingly, it has been found that when 1-butanethiol is reacted with a haloacetaldehyde in the presence of pyridine and certain derivatives thereof as the solvent, the novel compound (n-butylthio)acetaldehyde is formed.

Also surprisingly, it has been found that when 1-butanethiol is reacted with a dihaloacetaldehyde in the presence of pyridine and certain derivatives thereof as the solvent, the novel compound bis(n-butylthio)acetaldehyde is formed.

Accordingly, it is an object of this invention to provide a new and improved process for preparing an α-formyl sulfide and an α,α-bis(hydrocarbylthio) aldehyde. It is also an object of this invention to provide novel organic compounds and the method for producing same.

Other aspects, objects and the several advantages of the invention will be apparent to those skilled in the art from the description and the appended claims.

In accordance with this invention, an α-formyl sulfide is prepared by the reaction of an α-halo aldehyde with a thiol or dithiol in a solvent comprising at least one material selected from the group consisting of pyridine, quinoline, isoquinoline, and a lower alkyl derivative of at least one of these heterocyclic bases. The reaction can be represented by the equation:

(1) 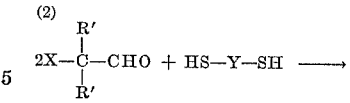

or (2) 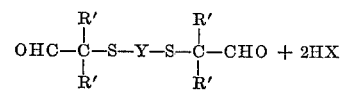

where R is a monovalent hydrocarbon radical selected from the group consisting of alkyl, cycloalkyl, alkenyl, cycloalkenyl, aryl and combinations thereof, preferably alkyl and cycloalkyl; R' is at least one member selected from the group consisting of R and hydrogen; X is a halogen selected from the group consisting of fluorine, chlorine, bromine and iodine, preferably chlorine or bromine; Y is a divalent hydrocarbon radical selected from the group consisting of alkylene, cycloalkylene, alkenylene, cycloalkenylene, arylene, and combinations thereof; the number of carbon atoms in R or Y does not exceed 18, i.e., is from 1 to 18; and the total number of carbon atoms in the α-formyl sulfide does not exceed 30, i.e., is from 3 to 30. All carbon atoms ranges herein are inclusive unless otherwise specified.

Also in accordance with this invention, an α,α-bis(hydrocarbylthio)aldehyde is prepared by the reaction of an α,α-dihalo aldehyde with a thiol in a solvent comprising at least one selected from the group consisting of pyridine, quinoline, isoquinoline, and a lower alkyl derivative of at least one of these heterocyclic bases. The reaction can be represented by the equation:

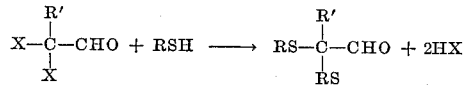

where R is a monovalent hydrocarbon radical selected from the group consisting of alkyl, cycloalkyl, alkenyl, cycloalkenyl, aryl and combinations thereof; R' is a member selected from the group consisting of R and hydrogen; X is a halogen selected from the group consisting of fluorine, chlorine, bromine, and iodine, preferably chlorine or bromine; the number of carbon atoms in R being from 1 to 18; and the total number of carbon atoms in the α,α-bis(hydrocarbylthio)aldehyde being from 4 to 40.

As examples illustrative of the reaction as represented by the equations above, bromoacetaldehyde reacts with 1-propanethiol to yield (n-propylthio)acetaldehyde, 1,4-butanedithiol reacts with 2-chloropropionaldehyde to give 1,4-bis(1-formylethylthio)butane, dibromoacetaldehyde reacts with ethanethiol to yield bis(ethylthio)acetaldehyde, and 2,2-dichloropropionaldehyde reacts with 1-butanethiol to give 2,2-bis(n-butylthio)propionaldehyde.

Examples of some α-formyl sulfides that can be prepared by the method of this invention are
(methylthio)acetaldehyde,
(ethylthio)acetaldehyde,
(n-butylthio)acetaldehyde,
(phenylthio)acetaldehyde,
(benzylthio)acetaldehyde,
2-(isobutylthio)propionaldehyde,
2-n-octyl-2-(n-dodecylthio)decanal,
2-(ethylthio)eicosanal,
cyclopentyl(n-octadecylthio)acetaldehyde,
2-(allylthio)-3-phenylpropionaldehyde,
2-(2-cyclohexen-1-yl)-2-(p-tolylthio)propionaldehyde,
2-(cyclohexylmethyl)-2-(3-methylcyclopentylthio)-3-methylhexanal,
2-phenyl-2-(cyclopentylmethylthio)-8-nonenal,
2-(2-cycloocten-1-ylthio)butyraldehyde,
1,2-bis(formylmethylthio)ethane, 1,6-bis(1-formylethylthio)-3-methylhexane,
1,18-bis(1-ethyl-1-formylpropylthio)octadecane,
1,3-bis(1-formyl-4-pentenylthio)cyclopentane,
1,4-bis(phenylformylmethylthio)-2-butene,
3,6-bis(cyclohexylformylmethylthio)cyclohexene,
1,4-bis(1-formyl-2-phenylethylthio)benzene, and
1,2-diphenyl-1,2-bis(formylmethylthio)ethane.

Examples of some α,α-bis(hydrocarbylthio)aldehydes that can be prepared by the method of this invention are bis(methylthio)acetaldehyde,
bis(ethylthio)acetaldehyde,
bis(n-butylthio)acetaldehyde,
bis(phenylthio)acetaldehyde,
bis(benzylthio)acetaldehyde,
2,2-bis(isobutylthio)propionaldehyde,
2,2-bis(n-hexylthio)butyraldehyde,
2,2-bis(3-ethyloctylthio)hexanal,
2,2-bis(1-butyldecylthio)decanal,
2,2-bis(n-octadecylthio)butyraldehyde,
2,2-bis(ethylthio)eicosanal,
bis(cyclopentylthio)acetaldehyde,
bis(allylthio)acetaldehyde,
bis(2-cyclohexen-1-ylthio)acetaldehyde,
2,2-bis(p-tolylthio)propionaldehyde,
2,2-bis(3-methylcyclopentylthio)butyraldehyde,
α,α-bis(methylthio)phenylacetaldehyde,
α,α-bis(ethylthio)cyclohexaneacetaldehyde,
2,2-bis(n-propylthio)-4-pentenal,
α,α-bis(n-butylthio)-2-cyclooctene-1-acetaldehyde,
α,α-bis(ethylthio)-o-tolylacetaldehyde,
2,2-bis(n-propylthio)-3-phenylpropionaldehyde, and
α,α-bis(ethylthio)cyclopentanebutyraldehyde.

Generally, any thiol satisfying the above general description thereof can be employed in this invention. Examples of such thiols are as follows:

Methanethiol, ethanethiol, 1-butanethiol, 2-butanethiol, 3-hexanethiol, 1-dodecanethiol, 1-octadecanethiol, benzenethiol, p-toluenethiol, α-toluenethiol, 2-propene-1-thiol, cyclohexanethiol, 3-methylcyclopentanethiol, cyclopentanemethanethiol, 2-cyclooctene-1-thiol, 1,2-ethanethiol, 2-methyl-1,6-hexanedithiol, 1,18-octadecanedithiol, 1,3-cyclopentanedithiol, 2-butene-1,4-dithiol, 2-cyclohexene-1,4-dithiol, p-benzenedithiol, and 1,2-diphenyl-1,2-ethanedithiol. The dithiols are not presently preferred to be employed in forming the bis(hydrocarbylthio)aldehydes of this invention.

Also, any halo aldehyde satisfying the above description can be employed in this invention.

Examples of α-halo aldehydes are as follows: chloroacetaldehyde, bromoacetaldehyde, 2-iodopropionaldehyde, 2-fluorohexanal, 2-chlorodecanal, 2-n-octyl-2-bromodecanal, 2-chloroeicosanal, cyclopentylchloroacetaldehyde, 2-chloro-3-phenylpropionaldehyde, 2-(2-cyclohexen-1-yl)-2-bromopropionaldehyde, 2-(cyclohexylmethyl)-2-fluoro-3-methylhexanal, 2-phenyl-2-iodo-8-nonenal, 2-chlorobutyraldehyde, 2-ethyl-2-bromobutyraldehyde, 2-chloro-5-hexenal, phenylbromoacetaldehyde, and cyclohexylbromoacetaldehyde.

Examples of α,α-dihalo aldehydes are as follows:

difluoroacetaldehyde,
dichloroacetaldehyde,
dibromoacetaldehyde,
diiodoacetaldehyde,
chlorobromoacetaldehyde,
fluoroiodoacetaldehyde,
2-fluoro-2-chloropropionaldehyde,
2,2-dibromodecanal,
2,2-dichloroeicosanal,
2,2-dibromo-3-butenal,
α-fluoro-α-bromocyclohexaneacetaldehyde,
α,α-dichloro-3-cyclohexene-1-acetaldehyde,
α,α-dibromophenylacetaldehyde, and
α,α-dichlorocyclopentanebutyraldehyde.

if desired, the dihalo aldehydes can be employed as the hydrates.

As stated above pyridine, quinoline, isoquinoline and/or a lower alkyl derivative thereof can be used as the solvent in this invention. More specifically, a solvent employed in this invention is at least one material selected from the group consisting of pyridine, quinoline, isoquinoline, and monoalkyl and polyalkyl derivatives of pyridine, quinoline and isoquinoline which contain not more than 6 carbon atoms in any one alkyl group and not more than a total of 12 carbon atoms in all the alkyl groups in any one molecule. Mixtures of these solvents can be employed and are within the scope of this invention. Generally any lower alkyl derivative satisfying the above description can be employed in this invention. Examples of suitable derivatives of this type are 2-picoline, 3-picoline, 4-picoline, 2,4-lutidine, 2,6-lutidine, 4-ethylpyridine, quinaldine, lepidine, 3-methylisoquinoline, 5-ethyl-2-picoline, 2-isobutylpyridine, 3-n-hexylpyridine, 2,3,4-trimethylpyridine, 2,4,6-tri-n-butylpyridine, 4-ethylquinaldine, 3-n-hexylquinaldine, 2-n-pentyl-3-n-hexyllepidine, 3-isopropylisoquinoline, 3-methyl-4-n-butylisoquinoline, and 1,3-di-n-hexylisoquinoline. Pyridine is the solvent of choice. Although the concentration of solvent in the reaction mixture can vary over a wide range since it need be present only in an amount sufficient to aid the formation of the α-formyl sulfides, the solvent will usually constitute from about 15 weight percent to about 85 weight percent of the reaction mixture, more often constituting from about 25 weight percent to about 75 weight percent of the reaction mixture. It should be noted here that the above solvents appear to be unique in effecting the desired reaction of this invention. Neutral solvents such as benzene, ethyl ether and water, and other basic solvents such as triethylamine, cause the reaction involved to take different courses, thereby leading to products other than those produced by practicing this invention.

Although the reactants can be employed over a wide operable range of ratios, the mole ratio of monothiol or dithiol to α-halo aldehyde should be such as to provide from 1 to 6 —SH groups per molecule of the α-halo aldehyde, preferably from 1 to 3 —SH groups per molecule of the α-halo aldehyde. The order of addition of reactants is not critical. Batch or continuous reaction techniques can be employed. The reaction time can vary from about 1 minute to about 24 hours, usually falling in the range of from about 5 minutes to about 5 hours, depending on the reactivity of the reactants and the temperature employed. The desired temperature also depends on the nature of the reactants, but will usually be in the range of from about 0° to about 150° C., preferably from about 20° to about 70° C.

Similarly, the amounts of reactants used in preparing the α,α-bis(hydrocarbylthio) aldehyde can vary over a wide operable range of ratios. However, generally, the mole ratio of thiol to α,α-dihalo aldehyde should be from about 2:1 to about 8:1, preferably from about 2:1 to about 4:1. The order of addition of reactants presently does not appear critical. Batch or continuous techniques can also be employed. The reaction time can vary from about 1 minute to about 24 hours, usually falling within the range of from about 5 minutes to about 6 hours, depending in part on the reactivity of the reactants and temperature being employed. The desired reaction temperature also depends on the nature of the reactants, but will generally be within the range of from about 0 to about 200° C., preferably from about 40 to about 120° C.

Reaction pressures for each method of this invention should be sufficient to maintain the reaction mixture substantially in the liquid phase, although high pressures can be employed if desired. Such pressures can vary over a wide operable range depending upon the chosen reactant, solvent, and reaction temperature.

The α-formyl sulfides of this invention and in particular (n-butylthio)acetaldehyde can have utility as intermediates, e.g., they can be used in forming pharmaceutical agents, agricultural chemicals such as insecticides, fungicides, herbicides and the like, and 2-(benzylthio)-2-methylpropionaldehyde is an intermediate for forming penicillamine; polymerization modifiers; oil soluble complexing agents, i.e. additives in hyrocarbons such as oil, kerosene, gasoline and the like; and drilling fluid additives.

The $\alpha,\alpha$-bis(hydrocarbylthio) aldehydes of this invention and particularly bis(n-butylthio)acetaldehyde have utility as additives for petroleum fractions, intermediates in the manufacture of pharmaceutical agents, in the production of agricultural chemicals such as insecticides, fungicides, herbicides and the like, and in forming dyes.

Example I

Anhydrous chloroacetaldehyde was prepared by ether extraction of a 40 percent aqueous solution of the aldehyde, followed by drying of the ether extract over anhydrous magnesium sulfate, filtration of the drying agent, and distillation of most of the ether. The crude anhydrous chloroacetaldehyde was about 80 percent pure, as determined by gas chromatography, the other 20 percent being essentially ether; this material was suitable for use without further purification.

To a stirred solution of 90 g. (1.0 mole) of 1-butanethiol in 250 ml. of pyridine was added 32.4 g. of the freshly prepared anhydrous chloroacetaldehyde containing about 25.9 g. (0.33 mole) of the desired aldehyde. The solution, which contained 66.7 weight percent pyridine, was stirred at 35° to 40° C. for 4 hours, then cooled and diluted with three parts of water. The organic layer was separated, the aqueous layer was extracted twice with ether. The organic layers were combined and dried over anhydrous magnesium sulfate, the drying agent was filtered, and the filtrate was concentrated on a steam bath. Gas chromatographic analysis of the concentrate on a 4.5 foot silicone column indicated the yield of (n-butylthio)acetaldehyde, identified subsequently, to be about 69 percent. In addition, two higher boiling components appearing to be n-butyl disulfide and 1,2-bis(n-butylthio)ethylene were present in yields of about 2.0 and 1.0 percent, respectively. The concentrate was then flash distilled to remove solvent, and the distillate was redistilled to give a product of 99 percent purity, as determined by gas chromatography, boiling at 84° C./20 mm., $n_D^{20}$ 1.4724. The infrared spectrum of this product was consistent with that to be expected for (n-butylthio)acetaldehyde ($C_6H_{12}OS$).

Analysis.—Calculated for $C_6H_{12}OS$: C, 54.5; H, 9.01; S, 24.2. Found: C, 55.0; H, 9.0; S, 23.2; Cl, 0.62. This clearly shows (n-butylthio)acetaldehyde was produced.

In order to further confirm that the product of the method of this example was (n-butylthio)acetaldehyde, the product of the method of this example was reacted with 2,4-dinitrophenylhydrazine which, if the product of the method of this example was (n-butylthio)acetaldehyde, should yield the 2,4-dinitrophenylhydrazone ($C_{12}H_{16}N_4O_4S$) of (n-butylthio)acetaldehyde.

Analysis of the 2,4-dinitrophenylhydrazone.—Calculated for $C_{12}H_{16}N_4O_4S$: C, 46.2; H, 5.2; N, 18.0; S, 10.3. Found: C, 46.1; H, 5.2; N, 17.3; S, 10.5.

Example II

An experiment was carried out essentially by the method of Example I except that triethylamine was substituted for the pyridine used as solvent, and the order of addition of reaction materials was reversed. To a stirred solution of 32.46 g. of the crude anhydrous chloroacetaldehyde, containing 25.9 g. (0.33 mole) of the aldehyde, in 250 ml. of triethylamine was added 60 g. (0.63 mole) of 1-butanethiol. Dark particles separated from the reaction mixture during the addition of the mercaptan. The mixture was stirred at about 35 to 40° C. for 4 hours. A large amount of white solid precipitated, in an exothermic reaction, during the early portion of this time period. Upon termination of the 4-hour period of stirring, the reaction mixture, which contained a large amount of solids, was cooled. Water was then added, whereupon most of the solid material dissolved. The organic layer was separated, and the aqueous layer was extracted twice with ether. The organic layers were combined and dried over anhydrous magnesium sulfate. After removal of the drying agent and solvent, an attempt to distill the product resulted in extensive decomposition, and no (n-butylthio)acetaldehyde could be isolated. Thus, triethylamine is unsatisfactory for use as a solvent in this invention.

Example III

To 250 ml. of benzene were added 37.0 g. of crude anhydrous chloroacetaldehyde of 70 weight percent purity, prepared as in Example I, containing 25.9 g. (0.33 mole) of the aldehyde, and 90.0 g. (1.0 mole) of 1-butanethiol. The resulting mixture was stirred at approximately 35° C. for 4 hours. After the reaction mixture was cooled, it was washed with aqueous potassium carbonate, then with water. The washed benzene solution was dried over anhydrous magnesium sulfate. After removal of the drying agent, the solvent was evaporated to give a residue which was found by gas chromatographic analysis to contain 2.7 g. of n-butyl disulfide, 28.3 g. of 1,2-bis(n-butylthio)ethylene, 25.7 g. of 1,1,2-tris(n-butylthio)ethane, and only a trace of (n-butylthio)acetaldehyde. Thus, benzene is unsatisfactory for use as a solvent in the preparation of (n-butylthio)acetaldehyde.

Example IV

Another experiment was carried out by the procedure used in Example III except that 250 ml. of ethyl ether instead of benzene was used as the solvent. Gas chromatographic analysis of the product, carried out as in the preceding experiment, showed this product contained 2.9 g. of n-butyl disulfide, 22.1 g. of 1,2-bis(n-butylthio)ethylene, 26.5 g. of 1,1,2-tris(n-butylthio)ethane, and only a trace of (n-butylthio)acetaldehyde. Thus, ethyl ether is unsatisfactory for use as a solvent in the preparation of (n-butylthio)acetaldehyde.

Example V

To 250 ml. of water was added 37.0 g. of crude anhydrous chloroacetaldehyde of 70 weight percent purity, prepared as in Example I, containing 25.9 g. (0.33 mole) of the aldehyde, and 90.0 g. (1.0 mole) of 1-butanethiol. The resulting mixture was stirred at approximately 35° C. for 4 hours. After the reaction mixture was cooled, it was extracted with ether. The ether extract was then washed with aqueous potassium carbonate, then washed with water, and finally dried over anhydrous magnesium sulfate. After removal of the drying agent, the solvent was evaporated to give a residue which was found by gas chromatographic analysis to contain 0.7 g. of n-butyl disulfide, 11.3 g. of 1,2-bis(n-butylthio)ethylene, 43.5 g. of 1,1,2-tris(n-butylthio)ethane, and only 1.9 g. of (n-butylthio)acetaldehyde. Therefore, water is unsatisfactory for use as a solvent in the preparation of (n-butylthio)acetaldehyde.

Thus, it is clearly shown that only the solvents of this invention will produce the results of this invention.

Example VI

A stirred solution of 78 g. (0.69 mole) of dichloroacetaldehyde, 300 ml. of 1-butanethiol, and 500 ml. of pyridine was heated at from 78 to 80° C. for about 4 hours. The reaction mixture was then cooled, and about 29.9 g. of solid was removed by filtration. The filtrate (767 g.) was concentrated to 203 g. by heating and an additional 23 g. of solid was removed by filtering. The filtrate was then concentrated to 127 g. by further heating. From this concentrate about 70 g. of a distillate fraction was obtained by flash distillation which fraction was found by gas chromatographic analysis, with subsequent identification of the major components, to contain 14.7 g. of n-butyl disulfide, 49.2 g. (32.4 mole percent yield) of bis (n-butylthio)acetaldehyde, i.e., (n-C$_4$H$_9$S)$_2$CHCHO, and 6.1 g. of unidentified residue. The n-butyl disulfide was identified by comparison of its gas chromatographic retention time with that of an authentic specimen of n-butyl disulfide. To identify the bis(n-butylthio)acetaldehyde, a new compound, a flash distilled product obtained above was redistilled whereby there was obtained a pure product distilling at 96 to 98° C./0.05 millimeter, $n_D^{20}$ 1.5045, which pure product had the same gas chromatographic retention time as the component designated above as bis (n-butylthio)acetaldehyde.

Elemental analysis and molecular weight determination of the product distilling at 96 to 98° C./0.05 millimeter gave values in substantial agreement with those calculated for bis(n-butylthio)acetaldehyde (C$_{10}$H$_{20}$OS$_2$).

*Analysis.*—Calculated for C$_{10}$H$_{20}$OS$_2$: C, 54.5; H, 9.1; S, 29.1; molecular weight, 220.4. Found: C, 54.5; H, 9.1; S, 29.5; molecular weight, 207. Thus, it is shown that bis (n-butylthio)acetaldehyde was produced.

In order to further confirm that the product of the method of this example was bis(n-butylthio)acetaldehyde, it was reacted with 2,4-dinitrophenylhydrazine. This should yield the 2,4-dinitrophenylhydrazone derivative (C$_{16}$H$_{24}$N$_4$O$_4$S$_2$)

melting point 61 to 62° C., of bis(n-butylthio)acetaldehyde.

*Analysis.*—Calculated for C$_{16}$H$_{24}$N$_4$O$_4$S$_2$: C, 48.0; H, 6.0; S, 16.0. Found: C, 48.1; H, 6.4; S, 16.0.

Example VII

A stirred mixture of 78 g. (0.69 mole) of dichloroacetaldehyde, 250 g. of 1-butanethiol, and 500 ml. of benzene was heated at 80° C. for 4 hours. The reaction mixture was then concentrated on a steam bath. Gas chromatographic analysis of the concentrated mixture showed that butyl (n-butylthio)thiolacetate, n-butyl disulfide, and the di-n-butyl mercaptal of (n-butylthio)acetaldehyde were produced in yields of 41.8 g., 12.7 g., and 4.3 g., respectively. The identity of all three products was determined gas chromatographically by comparison with authentic samples. No bis(n-butylthio)acetaldehyde was obtained. Thus, benzene was unsatisfactory as a solvent in this reaction.

Example VIII

A stirred mixture of 39 g. (0.346 mole) of dichloroacetaldehyde, 130 g. of 1-butanethiol, and 300 ml. of benzene was heated at 210° F. for 4 hours. n-Butyl (butylthio)thiolacetate and n-butyl disulfide were produced in yields of 15.4 g. and 34.0 g., respectively, as determined by gas chromatographic analysis of the reaction mixture following filtration and concentration. No bis(n-butylthio) acetaldehyde was obtained. Thus, even at elevated temperatures benzene was unsatisfactory as a solvent in this reaction.

Example IX

A mixture of 42 g. (0.28 mole) of trichloroacetaldehyde, 155 ml. (1.40 moles) of 1-butanethiol, and 300 ml. of pyridine was heated at 70° C. for 4 hours. From the reaction mixture was obtained a 95 mole percent yield of the simple adduct, trichloroacetaldehyde n-butyl hemimercaptal. When the same starting materials, in the same amounts, were heated at 210° C. for 4 hours, there were obtained a 19.8 mole percent yield of 1,2-bis(n-butylthio) ethane, a 30 mole percent yield of n-butyl disulfide, and a 7 mole percent yield of (n-butylthio)acetaldehyde di-n-butyl mercaptal. The identification of the trichloroacetaldehyde n-butyl hemimercaptal was made by elemental analysis and by comparison of its melting point with that of the known compound; the identification of the other products was made by gas chromatographic analysis. Thus, it was shown that trihaloacetaldehydes do not undergo direct replacement of halogen, with the aldehyde group remaining intact, as do the α-halo aldehydes, and α,α-dihalo aldehydes of this invention.

Reasonable variations and modifications of this invention can be made, or followed in view of the foregoing disclosure and discussion, without departing from the spirit or scope thereof.

I claim:
1. A method of preparing an α-formyl sulfide comprising reacting an α-halo aldehyde of the formula

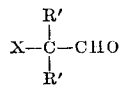

with a thiol of the formula RSH where R is a monovalent hydrocarbon radical selected from the group consisting of alkyl, cycloalkyl, alkenyl, cycloalkenyl, aryl and combinations thereof; each R' is independently selected from the group consisting of R and hydrogen; X is a halogen selected from the group consisting of fluorine, chlorine, bromine and iodine; the number of carbon atoms in R does not exceed 18; and the total number of carbon atoms in the α-formyl sulfide does not exceed 30, the reaction taking place in at least one solvent selected from the group consisting of pyridine, quinoline, isoquinoline, monoalkyl and polyalkyl derivatives of at least one of pyridine, quinoline and isoquinoline containing not more than 6 carbon atoms in any one alkyl groups and not more than a total of 12 carbon atoms in all the alkyl groups in any one molecule.

2. The method of claim 1 wherein the halo aldehyde is chloroacetaldehyde, said thiol is butanethiol, said solvent is pyridine, and the α-formyl sulfide is (n-butylthio) acetaldehyde.

3. The method of claim 1 wherein the temperature of carbon atoms in any one alkyl group and not more than monothiol to α-halo aldehyde is in the range of from about 1 to about 6 —SH groups per molecule of the α-halo aldehyde, and the solvent constitutes from about 15 to about 85 percent of the reaction mixture.

4. A method of preparing an α-formyl sulfide comprising reaction an α-halo aldehyde of the formula

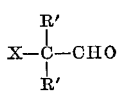

with a dithiol of the formula HS—Y—SH where R is a monovalent hydrocarbon radical selected from the group consisting of alkyl, cycloalkyl, alkenyl, cycloalkenyl, aryl and combinations thereof; each R' is independently selected from the group consisting of R and hydrogen; X is a halogen selected from the group consisting of fluorine, chlorine, bromine and iodine; Y is a divalent hydrocarbon radical selected from the group consisting of alkylene, cycloalkylene, alkenylene, cycloalkenylene, arylene and combinations thereof; the number of carbon atoms in R or in Y does not exceed 18; and the total number of carbon atoms in the α-formyl sulfide does not exceed 30, the reaction taking place in at least one solvent selected from the group consisting of pyridine, quinoline, isoquinoline, monoalkyl and polyalkyl derivatives of at least one of pyridine, quinoline and isoquinoline containing not more than 6 carbon atoms in any one alkyl group and not more than a total of 12 carbon atoms in all the alkyl groups in any one molecule.

5. The method of claim 4 wherein the temperature of reaction is from about 0 to about 150° C. and the mole ratio of dithiol to α-halo aldehyde is in the range of from about 1 to about 6 —SH groups per molecule of the α-halo aldehyde, and the solvent constitutes from about 15 to about 85 weight percent of the reaction mixture.

6. A method of preparing an α,α-bis(hydrocarbylthio)

aldehyde comprising reacting an α,α-dihalo aldehyde of the formula

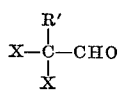

with a thiol of the formula RSH where R is a monovalent hydrocarbon radical selected from the group consisting of alkyl, cycloalkyl, alkenyl, cycloalkenyl, aryl and combinations thereof; R' is independently selected from the group consisting of fluorine, chlorine, bromine and iodine; the number of carbon atoms in R does not exceed 18; and the total number of carbon atoms in the α,α-bis(hydrocarbylthio)aldehyde does not exceed 40, the reaction taking place in at least one solvent selected from the group consisting of pyridine, quinoline, isoquinoline, monoalkyl and polyalkyl derivatives of pyridine, quinoline and isoquinoline containing not more than 6 carbon atoms in any one alkyl group and not more than a total of 12 carbon atoms in all the alkyl groups in one molecule.

7. A method according to claim 6 wherein the dihalo aldehyde is dichloroacetaldehyde, said thiol is 1-butanethiol, said solvent is pyridine, and the α,α-bis(hydrocarbylthio)aldehyde is bis(n-butylthio)acetaldehyde.

8. The method according to claim 6 wherein the temperature of the reaction is from about 0 to 200° C., the mole ratio of thiol to α,α-dihalo aldehyde is in the range of from about 2:1 to about 8:1, and the solvent constitutes from about 15 to about 85 weight percent of the reaction mixture.

9. Bis(n-butylthio)acetaldehyde.

References Cited

FOREIGN PATENTS 150,502  1/1963  Russia.

LEON ZITVER, *Primary Examiner.*

R. H. LILES, *Assistant Examiner.*

U.S. Cl. X.R.

260—455, 569, 598, 599; 167—22, 65; 71—98; 44—76

UNITED STATES PATENT OFFICE
CERTIFICATE OF CORRECTION

Patent No. 3,419,617　　　　　　　　　　　　　December 31, 1968

Richard C. Doss

It is certified that error appears in the above identified patent and that said Letters Patent are hereby corrected as shown below:

Column 8, line 37, "carbon atoms in any one alkyl group and not more than" should read -- reaction is from about 0 to 150° C., the mole ratio of --.

Signed and sealed this 7th day of April 1970.

(SEAL)
Attest:

Edward M. Fletcher, Jr.　　　　　　　　　　　WILLIAM E. SCHUYLER, JR.
Attesting Officer　　　　　　　　　　　　　　　Commissioner of Patents